(12) United States Patent
Lee et al.

(10) Patent No.: US 9,936,379 B2
(45) Date of Patent: Apr. 3, 2018

(54) MOBILE DEVICE AND METHOD OF INFORMATION TRANSMISSION

(71) Applicant: Intel Corporation, Santa Clara, CA (US)

(72) Inventors: Anthony Lee, San Diego, CA (US); Guotong Wang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/656,333

(22) Filed: Mar. 12, 2015

(65) Prior Publication Data

US 2015/0264561 A1    Sep. 17, 2015

Related U.S. Application Data

(63) Continuation-in-part of application No. 14/641,594, filed on Mar. 9, 2015.

(30) Foreign Application Priority Data

Mar. 12, 2014  (CN) .......................... 2014 1 0089909
Feb. 16, 2015  (CN) .......................... 2015 1 0083778
Mar. 12, 2015  (CN) .......................... 2015 1 0107649

(51) Int. Cl.
| H04W 8/24 | (2009.01) |
| H04W 4/00 | (2018.01) |
| H04W 8/22 | (2009.01) |
| H04W 60/00 | (2009.01) |

(52) U.S. Cl.
CPC ............ *H04W 8/24* (2013.01); *H04W 4/005* (2013.01); *H04W 8/22* (2013.01); *H04W 60/00* (2013.01)

(58) Field of Classification Search
CPC ..... H04W 60/00; H04W 60/04; H04W 4/005; H04W 88/02; H04W 8/22; H04W 8/24
See application file for complete search history.

(56) References Cited

U.S. PATENT DOCUMENTS

| 2010/0216465 A1* | 8/2010 | Mubarek ............... | H04W 48/18 455/435.1 |
| 2012/0236822 A1* | 9/2012 | Fang ..................... | H04W 76/02 370/331 |
| 2013/0188515 A1* | 7/2013 | Pinheiro ............... | H04W 4/001 370/254 |
| 2013/0250827 A1* | 9/2013 | Patwardhan ........... | H04W 8/24 370/311 |
| 2013/0265952 A1* | 10/2013 | Lee ....................... | H04W 4/005 370/329 |

* cited by examiner

*Primary Examiner* — Magdi Elhag
(74) *Attorney, Agent, or Firm* — Schiff Hardin LLP

(57) ABSTRACT

A mobile device and information transmission method are provided. The information transmission method is applied to the mobile device in M2M communication and includes the steps of determining whether a base station and the mobile device support transmission of capability information of the mobile device by a General Extension Message; and determining whether the capability information of the mobile device is changed when the base station and the mobile device support transmission of the capability information by the General Extension Message, wherein when the capability information of the mobile device is changed, the changed capability information is tied up with a Registration Message and transmitted to the base station by the General Extension Message.

13 Claims, 2 Drawing Sheets

MOBILE DEVICE AND METHOD OF INFORMATION TRANSMISSION

CROSS REFERENCE RELATED APPLICATIONS

This Application is a Continuation-In-Part of pending U.S. patent application Ser. No. No. 14/641,594 filed on Mar. 09, 2015, which claimed the benefit of both China Patent Application No. 201410089909.9 filed on Mar. 12, 2014, and China Patent Application No. 201510083778.8 filed on Feb. 16, 2015. This application also claims the benefit of China Patent Application No. 201510107649.8 filed on Mar. 12, 2015 The entireties of which are incorporated by reference herein.

BACKGROUND OF THE INVENTION

Field of the Invention

The invention generally relates to message transmission technology, and more particularly, to technology for transmitting information when the capability information of a mobile device is changed in the Machine To Machine (M2M) communication.

Description of the Related Art

Wireless communication systems are widely deployed to provide various telecommunication services such as telephony, video, data, messaging, and broadcast. Typical wireless communication systems may employ multiple-access technologies capable of supporting communication with multiple users by sharing available system resources (e.g., bandwidth, transmission power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

In addition, as the population adopts communication technology, in Machine To Machine (M2M) communication, devices can exchange messages with each other using communication technologies, such as Global System for Mobile Communications (GSM), General Packet Radio Services (GPRS), Universal Mobile Telecommunications System (UMTS), Code Division Multiple Access 2000 (CDMA 2000), 1× High Rate Packet Data (1×HRPD), Long Term Evolution (LTE), etc., to achieve more efficient communication services.

In the CDMA 2000 system referring to Evolution-Data Optimized (EV-DO) of the Revision F (Rev F), in the M2M communication, the capability information of the mobile devices can be tied up with a Registration Message (RGM), an Origination Message (ORM) or a Response Message (PRM) and transmitted to the base station by General Extension Message (GEM). However, the mobile device may transmit the capability information of the mobile device only when transmitting the Registration Message, and the Registration Message may be transmitted every few days. Therefore, when the capability information of the mobile device is changed, the mobile device cannot inform the base station that the capability information of the mobile device has changed, so that an error in communication between the mobile device and the base station may occur.

BRIEF SUMMARY OF THE INVENTION

A device and method for information transmission are provided to overcome the aforementioned problems.

An embodiment of the invention provides an information transmission method. The information transmission method is applied to the mobile device in M2M communication and includes the steps of determining whether a base station and the mobile device support transmission of capability information of the mobile device by a General Extension Message; and determining whether the capability information of the mobile device is changed when the base station and the mobile device support transmission of the capability information by the General Extension Message, wherein when the capability information of the mobile device is changed, the changed capability information is tied up with a Registration Message and transmitted to the base station by the General Extension Message.

An embodiment of the invention provides a mobile device. The mobile device is applied to M2M communication. The mobile device comprises a transmission module and a processing module. The transmission module is configured to transmit capability information to a base station. The processing module is configured to determine whether a base station and the mobile device support transmission of capability information of the mobile device by a General Extension Message; and to determine whether the capability information of the mobile device is changed when the base station and the mobile device support transmission of the capability information by the General Extension Message, wherein when the capability information of the mobile device is changed, the changed capability information is tied up with a Registration Message and transmitted to the base station by the General Extension Message.

Other aspects and features of the invention will become apparent to those with ordinary skill in the art upon review of the following descriptions of specific embodiments of communication transmission methods and systems.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
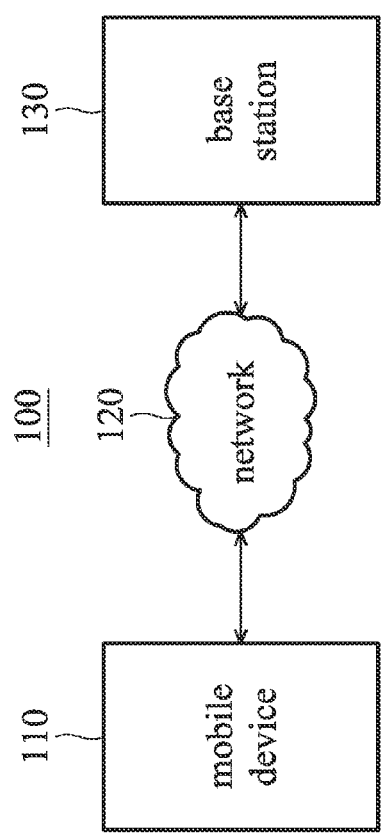
FIG. 1 is a block diagram of the communication system 100 according to an embodiment of the invention.

FIG. 1 is a block diagram of the communication system 100 according to an embodiment of the invention. The communication system comprises a mobile device 110, a network 120 and a base station 130.

The embodiments of the invention are related to the mobile device 110 and the mobile device 110 is applied to a Machine To Machine (M2M) communication. The mobile device 110 may be a user apparatus or a mobile station which is configured to establish voice call and/or provide data to the user. The mobile device 110 can connect with a computation device, such as a notebook computer, a desktop computer, or a self-contained device such as personal digital assistant (PDA). The mobile device 110 also can be called a system, a user unit, a user station, a mobile station, a remote station, an access point, a remote terminal, a user terminal, user agency or user equipment. The mobile device 110 may also be a wireless device, a mobile phone, a personal communication service (PCS) phone, a cordless phone, a session initiation protocol (SIP) phone, a wireless local loop (WLL) station, a portable device with wireless link function, or a processing device connected with a wireless modem.

In an embodiment of the invention, the network 120 can operate according to different radio access technologies, such as LTE technology, CDMA 2000 technology (e.g. radio transmission technology (RTT), 1xEV-DO Release 0/A/B/C, 1xEV-DO Release D/E/F), WiMax, wireless local area network, Universal Mobile Telecommunications System (UMTS), etc. When the network 120 is a CDMA 2000 system, the network 120 may comprise a transceiver, a controller, and a kernel network. The controller is a Base Station Controller (BSC). The kernel network comprises a Circuit Switched (CS) domain and a Packet-Switched (PS) domain. The CS domain comprises a Mobile Switching Center emulation (MSCe), a Media Gateway (MGW), a Media Resource Function Processor (MPFP), a Signaling Gateway (SGW), Service Control Point emulation (SCPe), a Home Location Register emulation (HLRe), etc. The PS domain comprises a Packet Data Service Node (PSDN) and Authentication Authorization Accounting (AAA) server.

The base station 130 can also be referred to as a fixed station, an access point, a Node B, an enhanced base station, an eNB, or some other terminology.

Figure 2:
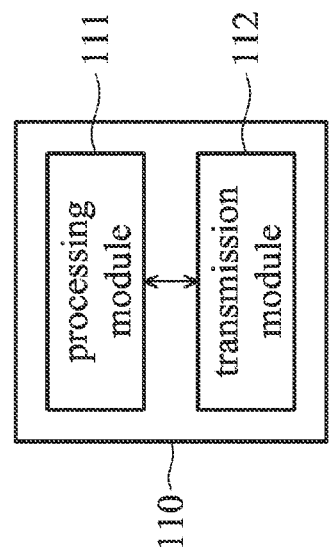
FIG. 2 is a block diagram of the mobile device 110 according to an embodiment of the invention.

FIG. 2 is a block diagram of the mobile device 110 according to an embodiment of the invention. As shown in FIG. 2, the mobile device 110 comprises a processing module 111 and a transmission module 112. FIG. 2 presents a simplified block diagram in which only the elements relevant to the invention are shown. However, the invention should not be limited to what is shown in FIG. 2.

The processing module is a general-purpose processor (GPP), a Micro Control Unit (MCU), or another processing device configured to perform the program codes stored in the mobile device 110. The processing module 111 is further configured to process the baseband signals to obtain information or data transmitted by the peer communications apparatus. The processing module 111 may also comprise a plurality of hardware elements to perform baseband signal processing. The baseband signal processing may comprise analog-to-digital conversion (ADC)/digital-to-analog conversion (DAC), gain adjustment, modulation/demodulation, encoding/decoding, and so on.

The transmission module 112 may receive RF signals via the antenna and process the received RF signals to convert the received RF signals to baseband signals to be processed by the processing module 111, or receive baseband signals from the processing module 111 and convert the received baseband signals to RF signals to be transmitted to a peer communications apparatus. The transmission module 112 may comprise a plurality of hardware elements to perform radio frequency conversion. For example, the transmission module 112 may comprise a power amplifier, a mixer, or others.

In some embodiments of the invention, the mobile device 110 further comprises a memory device (not shown). The memory device may be a volatile memory, e.g. a Random Access Memory (RAM), or a non-volatile memory, e.g. a flash memory, Read-Only Memory (ROM), or hard disk, or any combination thereof.

In an embodiment of the invention, in the M2M communication, when the mobile device 110 communicates with the base station 130 through the network 120, the processing module 111 will determine whether both the base station 130 and the mobile station 110 support transmission of capability information by a General Extension Message (GEM), wherein transmitting the capability information by the General Extension Message means that the capability information of the mobile device 110 is tied up with a Registration Message (RGM), an Origination Message (ORM) or a Response Message (PRM) and then transmitted to the base station 130 by the General Extension Message.

In an embodiment of the invention, the capability information can be terminal (mobile device 110) capability information and a recorded type of the General Extension. The capability information comprises the properties and the related parameter settings of the mobile device 110. In an embodiment of the invention, the content of the terminal capability information is described as Table 1:

TABLE 1

| DEVICE_CHARC_INCL | 1 |
| DEVICE_CHARC | 0 or 8 |
| DCA_SUPPORTED | 1 |
| MAX_EXT_SCI_USED | 1 |
| EXT_REG_PRD_USED | 1 |
| Reserved | 0-7 |

As shown in Table 1, the DEVICE_CHARC_INCL has 1 bit, and it indicates whether the DEVICE_CHARC information exists. If the DEVICE_CHARC information exists, the DEVICE_CHARC_INCL will be set to 1 and 8 bits will be provided for the DEVICE_CHARC information. If the DEVICE_CHARC information does not exist, the DEVICE_CHARC_INCL will be set to 0 and no bits will be provided for the DEVICE_CHARC information. The DCA_SUPPORTED has 1 bit, and it indicates whether the terminal supports the Dynamic Channel Assistant (DCA). When the DCA_SUPPORTED is set to 1, it indicates the terminal supports the Dynamic Channel Assistant. When the DCA_SUPPORTED is set to 0, it indicates the terminal does not support the Dynamic Channel Assistant. The MAX_EXT_SCI_USED have 1 bit, and it indicates whether the terminal supports the extended Slot Cycle Index (SCI), i.e. whether the length of the paging interval is extended when the terminal monitors the network. Compared to the 1x Rev.E, the 1x Rev.F adopts the extended Slot Cycle Index, and therefore the length of the paging interval may be longer. When the MAX_EXT_SCI_USED is set to 1, it indicates the terminal supports the extended Slot Cycle Index. When the MAX_EXT_SCI_USED is set to 0, it indicates the terminal does not support the extended Slot Cycle Index. The EXT_REG_PRD_USED has 1 bit, and it indicates whether the terminal supports the extended registration period. Compared to the 1x Rev.E, the 1x Rev.F adopts the extended registration period, and therefore the length of the registration period may be longer. When the EXT_REG_PRD_USED set to 1, it indicates the terminal supports the extended registration period. When the EXT_REG_PRD_USED set to 0, it indicates the terminal does not support the extended registration period. The Reserved is indicates the reserved bits, and it may have 0~7 bits. The DEVICE- _CHARC has 8 bits, and it indicates the properties of the terminal. The details of the DEVICE_CHARC are shown in Table 2.

TABLE 2

| Device Characteristic Bit Map | Assignment |
| --- | --- |
| ---- ---X | Mobility (not stationary) |
| ---- --X- | Power Sensitive |
| ---- -X-- | SO33 Default |
| ---- X--- | Reserved |
| ---X ---- | Reserved |
| --X- ---- | Reserved |
| -X-- ---- | Reserved |
| X--- ---- | Reserved |

As shown in Table 2, the eighth bit indicates whether the terminal is moving. In M2M communication, terminal may be fixed, but in some time interval, the terminal may be moved. The network can know whether the terminal is moving according to the setting of the eighth bit, and then adopts corresponding operation. When the terminal is moving, the eighth bit is set to 1. When the terminal is not moving the eighth bit is set to 0. The seventh bit indicates whether the terminal is power sensitive (e.g. the power of the terminal is large or small) and whether the terminal needs to save power. The network can know whether the terminal is power sensitive according to the setting of the seventh bit, and then adopts corresponding operation. When the seventh bit is set to 1, it indicates the terminal is power sensitive. When the seventh bit is set to 0, it indicates the terminal is not power sensitive. The sixth bit indicates whether the terminal supports the Service Option 33 (SO33) Default, wherein the SO33 is one type of Service Options, and it indicates the properties of data, e.g. video, file, short message, etc. The first bit to the fifth bit are the reserved bits, and these reserved bits will be set to 0 when not being utilized.

In an embodiment of the invention, the base station 130 confirms whether the base station 130 supports transmission of capability information by a General Extension Message according to its loading status, and transmits a broadcast message to the mobile device 110 to inform the mobile device 110 whether the base station 130 supports transmission of capability information by a General Extension Message. When the transmission module 112 receives the broadcast message transmitted from the base station 130, the processing module 111 will determine whether the base station 130 supports transmission of capability information by the General Extension Message according to the broadcast message. In addition, the processing module 111 of the mobile device 110 also determines whether the mobile device 110 supports transmission of capability information by a General Extension Message.

When one or both of the base station 130 and mobile device 110 can't support transmission of capability information by a General Extension Message, the mobile device 110 will maintain original registration method. That is to say, when one or both of the base station 130 and mobile device 110 can't support transmission of capability information by a General Extension Message, the transmission module 112 only transmits a Registration Message (RGM) to the base station 130, and the transmission module 112 will not transmit the capability information of the mobile device 110 by tying up the capability information with other messages.

In an embodiment of the invention, when the base station 130 and mobile device 110 can support the transmission of capability information by a General Extension Message, the processing unit 111 may further determine whether the capability information of the mobile device 110 is changed. In an embodiment of the invention, when the base station 130 and mobile device 110 can support the transmission of capability information by a General Extension Message, after the mobile device is booted, the transmission module 112 may tie up the capability information with the Registration Message (RGM) and then transmit it to the base station 130 by the General Extension Message. After the registration is completed, if the processing unit 111 determines the capability information of the mobile device 110 is changed, the transmission module 112 may immediately tie up the new capability information with the Registration Message (RGM) and then transmit it to the base station 130 by the General Extension Message. Therefore, when the processing unit 111 determines the capability information of the mobile device 110 is changed, the transmission module 112 may immediately tie up the changed capability information with a Registration Message (RGM) and then transmit it to the base station 130 by the General Extension Message. When the processing unit 111 determines the capability information of the mobile device 110 is not changed, the mobile device 110 will maintain the current registration status. The transmission module 112 may tie up the changed capability information with a Registration Message (RGM) and then transmit it to the base station 130 by the General Extension Message again until the capability information of the mobile device 110 is changed.

In an embodiment of the invention, the mobile device 110 may transmit a Registration Message to the base station 130 every registration period, and therefore when the mobile device 110 is in the next registration period and the capability information of the mobile device 110 is not changed, the processing unit 111 can choose whether to tie up the capability information with the Registration Message and transmit it to the base station 130 again.

In an embodiment of the invention, capability information of the mobile device 110 is changed means the mobile device is moving or the adopted setting of Dynamic Channel Assistant (DCA) or the Slot Cycle Index (SCI) is changed.

Figure 3:
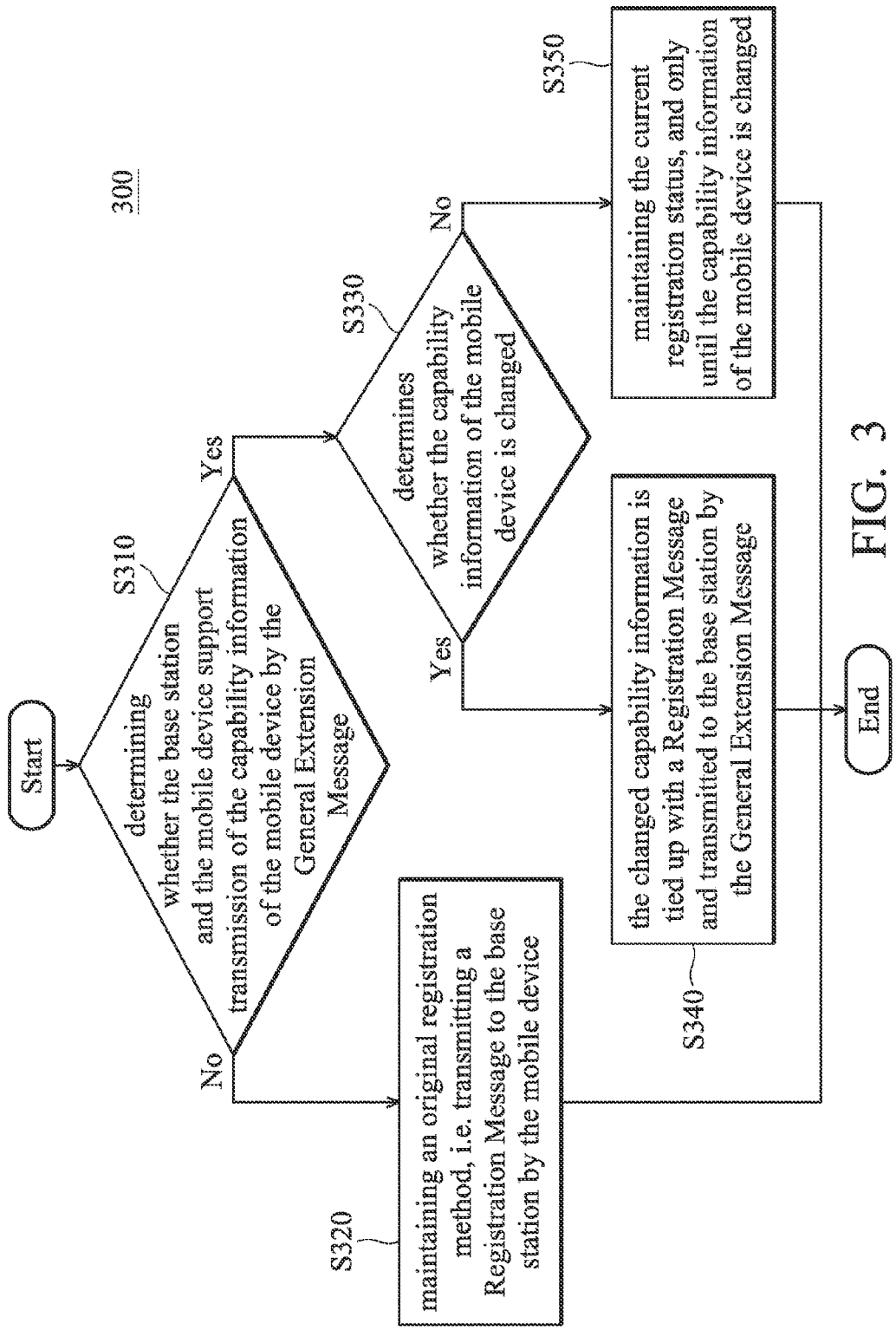
FIG. 3 is a flow chart 300 illustrating the information transmission method according to an embodiment of the invention.

FIG. 3 is a flow chart 300 illustrating the information transmission method according to an embodiment of the invention. The transmission method is applied to transmit the capability information to the base station 130 through M2M communication by the mobile device 110. As shown in FIG. 3, in step S310, the mobile device 110 determines whether the base station 130 and the mobile device 110 support transmission of the capability information of the mobile device 110 by the General Extension Message, wherein transmitting the capability information by the General Extension Message means that the capability information of the mobile device 110 is tied up with a Registration Message (RGM), an Origination Message (ORM) or a Response Message (PRM) and then transmitted to the base station 130 by the General Extension Message. When one or both of the base station 130 and the mobile device 110 can't support transmission of the capability information of the mobile device 110 by the General Extension Message, step S320 will be performed. In step S320, the mobile device 110 may maintain an original registration method, i.e. the mobile device 110 will transmit a Registration Message (RGM) to the base station 130, and the capability information will not transmitted with other messages by the General Extension Message.

When the base station 130 and the mobile device 110 can support transmission of the capability information of the mobile device 110 by the General Extension Message, step S330 will be performed. In step S330, the mobile device 110 further determines whether the capability information of the mobile device 110 is changed. If the capability information of the mobile device 110 is changed, step S340 will be performed. In step S340, the changed capability information is tied up with a Registration Message (RGM) and transmitted to the base station 130 by the General Extension Message. If the capability information of the mobile device 110 is not changed, step S350 will be performed. In step S350, the mobile device 110 maintains the current registration status, and only until the capability information of the mobile device 110 is changed, the changed capability information will be tied up with a Registration Message (RGM) and transmitted to the base station 130 by the General Extension Message.

In an embodiment of the invention, the mobile device 110 may transmit a Registration Message to the base station 130 every registration period, and therefore the step 350 further comprises: when the mobile device 110 is in the next registration period and the capability information of the mobile device 110 is not changed, the processing unit 111 can choose whether to tie up the capability information with the Registration Message and transmit it to the base station 130 again.

In an embodiment of the invention, step S310 further comprises: the base station 130 transmits a broadcast message to the mobile device 110. The mobile device 110 can determine whether the base station 130 supports transmission of the capability information by the General Extension Message according to the broadcast message.

Compared to conventional methods, in the method of the invention, the mobile device 110 doesn't need to wait the next registration period to tie up the changed capability information with the Registration Message and then transmit it to the base station 130 by the General Extension Message. In the method of the invention, when the capability information is changed, the mobile device 110 can immediately tie up the new capability information with the Registration Message (RGM) and then transmit it to the base station 130 by the General Extension Message. Therefore, when the capability information of the mobile device 110 is changed, the error of the communication between the mobile device and the base station can be avoided.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

Reference throughout this specification to "one embodiment" or "an embodiment" means that a particular feature, structure, or characteristic described in connection with the embodiment is included in at least one embodiment of the invention, but does not denote that they are present in every embodiment. Thus, the appearance of the phrases "in one embodiment" or "in an embodiment" in various places throughout this specification are not necessarily referring to the same embodiment of the invention.

The above paragraphs describe many aspects of the invention. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method adapted for information transmission in Machine-to-Machine (M2M) communication used in a mobile communication device, the method comprising:
  determining, by a processor of the mobile communication device, whether a base station and the mobile communication device support transmission of capability information of the mobile device by a General Extension Message;
  determining, by the processor of the mobile communication device, whether the capability information of the mobile device has changed in response to the determination that transmission of the capability information by the General Extension Message is supported by the base station and the mobile communication device; and
  tying up, by the processor of the mobile communication device, the changed capability information with a Registration Message and transmitting the tied up changed capability information and the Registration Message to the base station by the General Extension Message based on the change in capability information of the mobile communication device prior to a next registration period.

2. The information transmission method of claim 1, further comprising:
  maintaining a current registration method in response to the mobile communication device having determined that one or both of the base station and the mobile device lack support for the transmission of the capability information by the General Extension Message.

3. The information transmission method of claim 1, further comprising:
  maintaining a current registration status in response to the mobile communication device having determined that the capability information of the mobile has not been changed, wherein the mobile communication device maintains the current registration status until the mobile communication device has determined that the capability information has changed.

4. The information transmission method of claim 1, wherein the capability information comprises at least one of:

information corresponding to a mobility of the mobile communication device;

Dynamic Channel Assistant (DCA) information; and

Slot Cycle Index (SCI) information.

5. The information transmission method of claim 1, further comprising:

transmitting, by the base station, a broadcast message to the mobile device; and determining, by the mobile communication device, whether the base station supports transmission of the capability information by the General Extension Message based on the broadcast message.

6. The information transmission method of claim 1, wherein, in the next registration period, the mobile communication device is configured to transmit a next scheduled Registration Message to the base station.

7. The information transmission method of claim 1, wherein, in tying up of the changed capability information with the Registration Message and the transmitting of the tied up changed capability information and the Registration Message in advance of the next registration period, the mobile communication device is configured to provide the changed capability information to the base station without waiting until the next registration period.

8. The information transmission method of claim 1, wherein the tying up of the changed capability information with the Registration Message and the transmitting of the tied up changed capability information and the Registration Message comprises immediately tying up of the changed capability information with the Registration Message and immediately transmitting of the tied up changed capability information and the Registration Message such that the tied up changed capability information and the Registration Message is provided to the base station in advance of the next registration period.

9. A mobile device, adapted to use Machine-to-Machine (M2M) communication, comprising:

a transmitter configured to transmit capability information of the mobile device to a base station; and a processor configured to:

determine whether the base station and the mobile device support transmission of capability information of the mobile device by a General Extension Message;

determine whether the capability information of the mobile device has changed in response to the determination that transmission of capability information of the mobile device by the General Extension Message is supported by the base station and the mobile device; and tie up the changed capability information with a Registration Message and transmit the tied up changed capability information and the Registration Message to the base station by the General Extension Message based on the change in capability information of the mobile device prior to a next registration period.

10. The mobile device of claim 9, wherein the processor is further configured to maintain a current registration method in response to the determination that one or both of the base station and the mobile device lack support for the transmission of the capability information by the General Extension Message.

11. The mobile device of claim 9, wherein the processor is further configured to maintain a current registration status in response to the determination that the capability information of the mobile has not been changed, wherein the processor maintains the current registration status until the processor determines that the capability information has changed.

12. The mobile device of claim 9, wherein the capability information comprises at least one of:

information corresponding to a mobility of the mobile device;

Dynamic Channel Assistant (DCA) information; and

Slot Cycle Index (SCI) information.

13. The mobile device of claim 9, wherein the transceiver is configured to receive a broadcast message from the base station and the processor is configured to determine whether the base station supports transmission of the capability information by the a General Extension Message based on the broadcast message.

* * * * *